US012557832B2

(12) United States Patent
Le Brech et al.

(10) Patent No.: US 12,557,832 B2
(45) Date of Patent: Feb. 24, 2026

(54) DESTEMMER FOR A FRUIT HARVESTER

(71) Applicant: CNH Industrial America LLC, New Holland, PA (US)

(72) Inventors: Laurent Le Brech, Le Poiré-sur-Vie (FR); Venceslas Doinard, Torreilles (FR); Guillaume Supiot, Dompierre-sur-Yon (FR)

(73) Assignee: CNH Industrial America LLC, New Holland, PA (US)

( * ) Notice: Subject to any disclaimer, the term of this patent is extended or adjusted under 35 U.S.C. 154(b) by 1014 days.

(21) Appl. No.: 17/761,896

(22) PCT Filed: Sep. 18, 2020

(86) PCT No.: PCT/EP2020/076112
§ 371 (c)(1),
(2) Date: Mar. 18, 2022

(87) PCT Pub. No.: WO2021/053147
PCT Pub. Date: Mar. 25, 2021

(65) Prior Publication Data
US 2022/0338524 A1      Oct. 27, 2022

(30) Foreign Application Priority Data
Sep. 19, 2019    (EP) ..................................... 19315115

(51) Int. Cl.
*A23N 15/02*          (2006.01)
*A01D 46/28*          (2006.01)

(52) U.S. Cl.
CPC ............ *A23N 15/025* (2013.01); *A01D 46/28* (2013.01)

(58) Field of Classification Search
None
See application file for complete search history.

(56) References Cited

U.S. PATENT DOCUMENTS 4,152,977 A      5/1979   Lazzarini
4,936,205 A  *   6/1990   Flora ...................... A23N 15/02
                                                        99/635

(Continued)

FOREIGN PATENT DOCUMENTS

AU        2005202298 A1     12/2006
CN        105962396 A        9/2016

(Continued)

OTHER PUBLICATIONS

International Search Report and Written Opinion for PCT Application No. PCT/EP2020/076112 dated Dec. 1, 2020 (12 pages).

(Continued)

*Primary Examiner* — Elizabeth M Kerr
(74) *Attorney, Agent, or Firm* — CM Law PLLC; Stephen J. Weed

(57)          ABSTRACT

A destemmer for use in a fruit harvester includes a frame, a box carried by the frame, and an eccentric drive connected with the box. The box includes an inlet for receiving berries clusters. At least one top link interconnects the box and the frame. The top link include a first end pivotally connected to the frame, and a second end pivotally connected to the box. At least one bottom link interconnects the box and the frame. The bottom link include a first end pivotally connected to the frame, and a second end pivotally connected to the box. The longitudinal axis of each of the top link and the bottom link intersects at a virtual pivot axis, when viewed from a side of the box, which is located upstream from the inlet to the box, relative to a travel direction of the berries and MOG through the box.

15 Claims, 4 Drawing Sheets

(56)                References Cited

U.S. PATENT DOCUMENTS

| | | | |
|---|---|---|---|
| 6,823,778 | B2 | 11/2004 | Fouillet |
| 9,687,877 | B2 * | 6/2017 | Minnicucci .......... A23N 15/025 |
| 2007/0006563 | A1 | 1/2007 | Barr |

FOREIGN PATENT DOCUMENTS

| | | | |
|---|---|---|---|
| CN | 106108074 | A | 11/2016 |
| EP | 0615835 | B1 | 3/1997 |
| EP | 0884281 | A1 | 12/1998 |
| EP | 0908297 | B1 | 4/2000 |
| EP | 0908298 | B1 | 12/2000 |
| EP | 1170260 | A1 | 1/2002 |
| EP | 1310353 | A1 | 5/2003 |
| EP | 1403033 | A1 | 3/2004 |
| EP | 1535728 | A1 | 6/2005 |
| EP | 1536304 | A1 | 6/2005 |
| EP | 1403362 | B1 | 12/2005 |
| EP | 1459636 | B1 | 6/2006 |
| EP | 1396335 | B1 | 5/2007 |
| EP | 1922941 | A1 | 5/2008 |
| EP | 2018955 | A1 | 1/2009 |
| EP | 2314175 | B1 | 2/2012 |
| EP | 2412253 | A1 | 2/2012 |
| EP | 1944077 | B1 | 4/2012 |
| EP | 2283737 | B1 | 5/2012 |
| EP | 3132694 | A1 | 2/2017 |
| EP | 3006120 | B1 | 3/2017 |
| EP | 3135096 | A1 | 3/2017 |
| EP | 3222707 | A1 | 9/2017 |
| EP | 3326447 | A1 | 5/2018 |
| FR | 2756359 | A1 | 5/1998 |
| FR | 2837358 | A1 | 9/2003 |
| FR | 2840775 | A1 | 12/2003 |
| FR | 2851761 | A1 | 9/2004 |
| FR | 3058868 | A1 | 5/2018 |
| FR | 3058869 | A1 | 5/2018 |
| FR | 3059088 | A1 | 5/2018 |
| WO | 03027646 | A1 | 4/2003 |

OTHER PUBLICATIONS

Extended European Search Report for EP Application No. 19315115.6 dated Mar. 19, 2020 (four pages).

Simon Nordestgaard, "Equipment evolution: Destemming," The Australian Win Research Institute, PDF created Jul. 22, 2016 (one page).

Simon Nordestgaard, "Grape destemming and sorting technology— Developments in-winery and on-harvester," presented at ASVO Seminar, dated Nov. 18, 2014 (30 pages).

* cited by examiner

DESTEMMER FOR A FRUIT HARVESTER

BACKGROUND OF THE INVENTION

The present invention relates to harvesters for harvesting fruit, such as grapes, and, more specifically to a destemmer used in such harvesters.

A fruit harvester in the form of a self-propelled grape harvester includes a chassis which carries an onboard power plant and several onboard sub-systems for processing the grapes. The grape harvester straddles and traverses along at least one row of grape vines, and a picking system separates the grapes and Material Other than Grapes (referred to as "MOG", such as leaves, stems, wood debris, etc.) from the vines. The picking system typically is in the form of "pivotal shakers" or "trunk shakers". The pivotal shakers can include a double bank of flexible horizontal rods that strike and shake the vine to remove the fruit. The trunk shakers can include parallel skiis oriented on edge that move from side to side to impart horizontal vibration to the vines for removal of the grapes and MOG.

A conveying system transports the grapes and MOG to a cleaning system, which in turn separates the grapes from the MOG. The cleaning system can include one or more cleaning fans, a sorting table, and a destemmer. The one or more cleaning fans can be positioned upstream in the cleaning system, and remove larger MOG from the stream of crop material by suction and discharge the larger MOG, such as behind the harvester.

The sorting table can include a combination of conveying rollers and sorting rollers, which can be optimized for different sizes of grapes. The grapes which are dropped on the conveying rollers are transported to the sorting rollers, where the grapes are sorted from the MOG. The sorting rollers can be configured with an adjustable gap between the sorting rollers such that the grapes fall through and the MOG is transported to the end of the sorting table and discharged.

The destemmer removes the central stalk or stems from the grapes in a cluster/bunch of grapes. A destemmer can include a box or box-like structure which is carried by and moves in an oscillating manner within a frame. The berries (grapes) are supplied to the inlet of the box-like structure, which is shook (aggressively) using an eccentric drive to separate the berries from the stalk and stems. The berries are expelled through holes formed in the in the bottom and top walls of the box, and the rafle (central stalk of the bunch) and stems are expelled at the outlet of the box.

EP 3132694 A1 discloses a stationary destemmer for use in a winery. The destemmer includes a tubular structure (i.e., box) which moves within a fixed support frame. The box includes a pair of tabs which extend upwardly from the box at the inlet end of the box, and have holes through which a pin is inserted. The box moves in an oscillating manner about the longitudinal axis of the pin(s) which is(are) inserted through the holes in the tabs of the box.

SUMMARY OF THE INVENTION

The invention is directed to a destemmer for use in a fruit harvester. The destemmer includes a frame configured for mounting to a fruit harvester, a box carried by the frame, and an eccentric drive. The box includes an inlet for receiving berries and MOG. The eccentric drive is connected with the box for moving the box in an oscillating manner within the frame. The destemmer is characterized by at least one top link interconnecting the box and the frame, with each top link including a first end pivotally connected to the frame, a second end pivotally connected to the box, and a longitudinal axis. At least one bottom link interconnects the box and the frame, with each bottom link including a first end pivotally connected to the frame, a second end pivotally connected to the box, and a longitudinal axis. The longitudinal axis of each top link and the longitudinal axis of each bottom link intersect at a virtual pivot axis (when viewed from a side of the box) which is located upstream from the inlet to the box, relative to a travel direction of the berries and MOG through the box.

In an advantageous form of the invention, each top link and each bottom link are pivotally connected to the box at a location adjacent to the inlet of the box. The eccentric drive and the connections of the top and bottom links are configured such that the virtual pivot axis remains upstream of the inlet for each position of this drive. This structure provides for a substantial oscillation movement from the inlet portion of box and does not require a space-consuming linkage or tab extending into the area in front of the destemmer.

In another form of the invention, the box has a pair of opposing sides. The at least one top link includes a pair of top links, with each top link being pivotally connected with a respective side. The at least one bottom link includes a pair of bottom links, with each bottom link being pivotally connected with a respective side.

In yet another form of the invention, the box includes a top wall, a bottom wall and a pair of opposed sides. The top wall and the bottom wall each have a plurality of openings which are sized to allow the berries to pass therethrough. Each of the top links and the bottom links have an end which is pivotally connected with a respective one of the side walls.

In yet another form of the invention, the box includes a bottom wall and a longitudinally extending central plane which lies generally parallel with the bottom wall. Each of the top links and each of the bottom links lie at an acute angle relative to the central plane.

In yet another form of the invention, the movement of the box (during operation) ranges between a lower position in which the central plane inclines in a downward direction toward an outlet of the box, and an upper position in which the central plane lies generally horizontal.

In a still further form of the invention, the acute angle between the central plane and each top link can be the same or different than the acute angle between the central plane and each bottom link (when the destemmer is in a non-operating state).

In yet another form of the invention, the sum of the acute angles between the central plane and each top and bottom link is smaller than 90°.

In a still further form of the invention, each top link and each bottom link has a fixed length or an adjustable length.

In yet another form of the invention, the amplitude of movement of the box at the inlet end is less than the amplitude of movement of the box at an outlet end (during operation).

In a still further form of the invention, the box has an outlet that has an area smaller than the area of the inlet.

In yet another form of the invention, wherein the outlet of the box has a height that is greater at the center than adjacent the side walls.

In yet another form of the invention, the upper and lower edges of the outlet of the box are curved.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
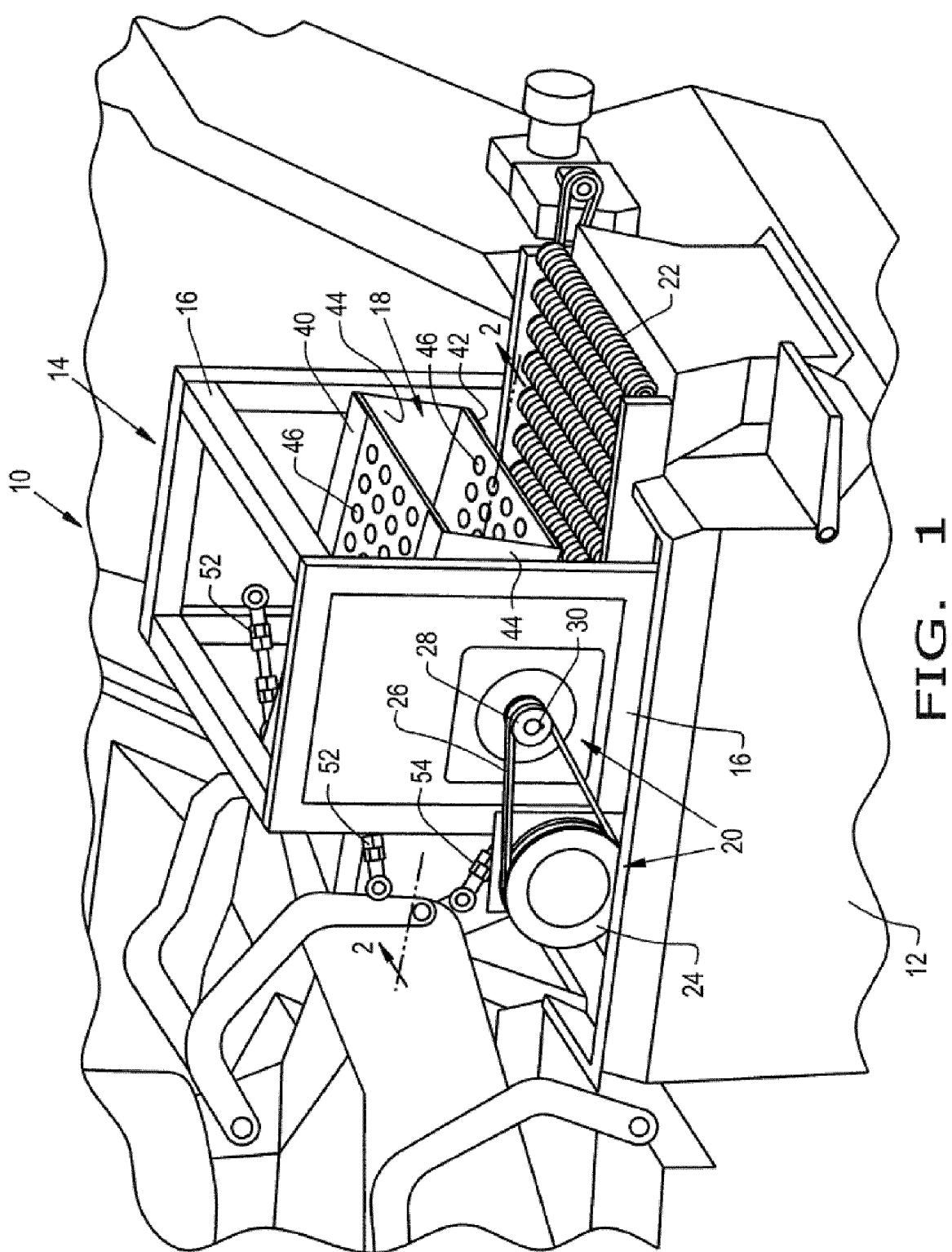
FIG. 1 is a perspective view of a portion of a fruit harvester which can include a destemmer comprising a rectangular oscillating box according to an embodiment of the present invention.

Referring now to the drawings, and more particularly to FIG. 1, there is shown a portion of a fruit harvester 10 in the form of a grape harvester. The fruit harvester 10 can be variously configured for different applications. The fruit harvester 10 can include a chassis 12 carrying multiple different sub-systems and components, such as a destemmer 14 forming part of a cleaning system (not numbered). The cleaning system can include other components, such as a cleaning fan and a sorting table (not shown in FIG. 1).

The destemmer 14 is used to remove the central stalk or stems from the grapes, and generally includes a frame 16, a box 18, an eccentric drive 20, and conveying rollers 22.

The frame 16 can be any suitable combination of structural members, sheet metal, etc. The frame 16 shown in FIG. 1 is illustrated as having square tubular members which carry sheet metal or plates on the opposed sides of the frame. The top and other two side walls are shown as being open in the embodiment shown in FIG. 1. Other embodiments and configurations are also possible.

The conveying rollers 22 are positioned below the box 18. The grapes (generically referred to as "berries" since the fruit harvester 10 could potentially be used to harvest other types of berries which are in a bunch with a central stalk and/or stems) are expelled through openings in the box (described below), land on the conveying rollers 22, and are carried by the conveying rollers downstream for further processing. The conveying rollers may be configured as sorting rollers, allowing for the passage of the loose berries, which then may be received into a container below the frame 16. Meanwhile, the rafles and MOG are received on top of the rollers 22 and conveyed by the same outside the fruit harvester 10 for deposit on the ground.

The eccentric drive 20 is connected with and provides oscillating movement to the box 18 in upwards and downwards directions. In the embodiment shown in FIGS. 1 and 2, an electric motor (not visible) drives a drive pulley 24, which in turn is connected via a drive belt 26 with a driven pulley 28. Of course, the power source could be a hydraulic motor, etc., instead of an electric motor. The driven pulley 28 is coupled via a shaft 30 with an eccentric disk 32. A link 34 has one end which is rotationally connected with the eccentric disk 32, and an opposite end which is rotationally connected with the box 18 at a suitable connection point. Rotation of the eccentric disk 32 thus causes upwards and downwards oscillating movements of the box 18.

Figure 2:
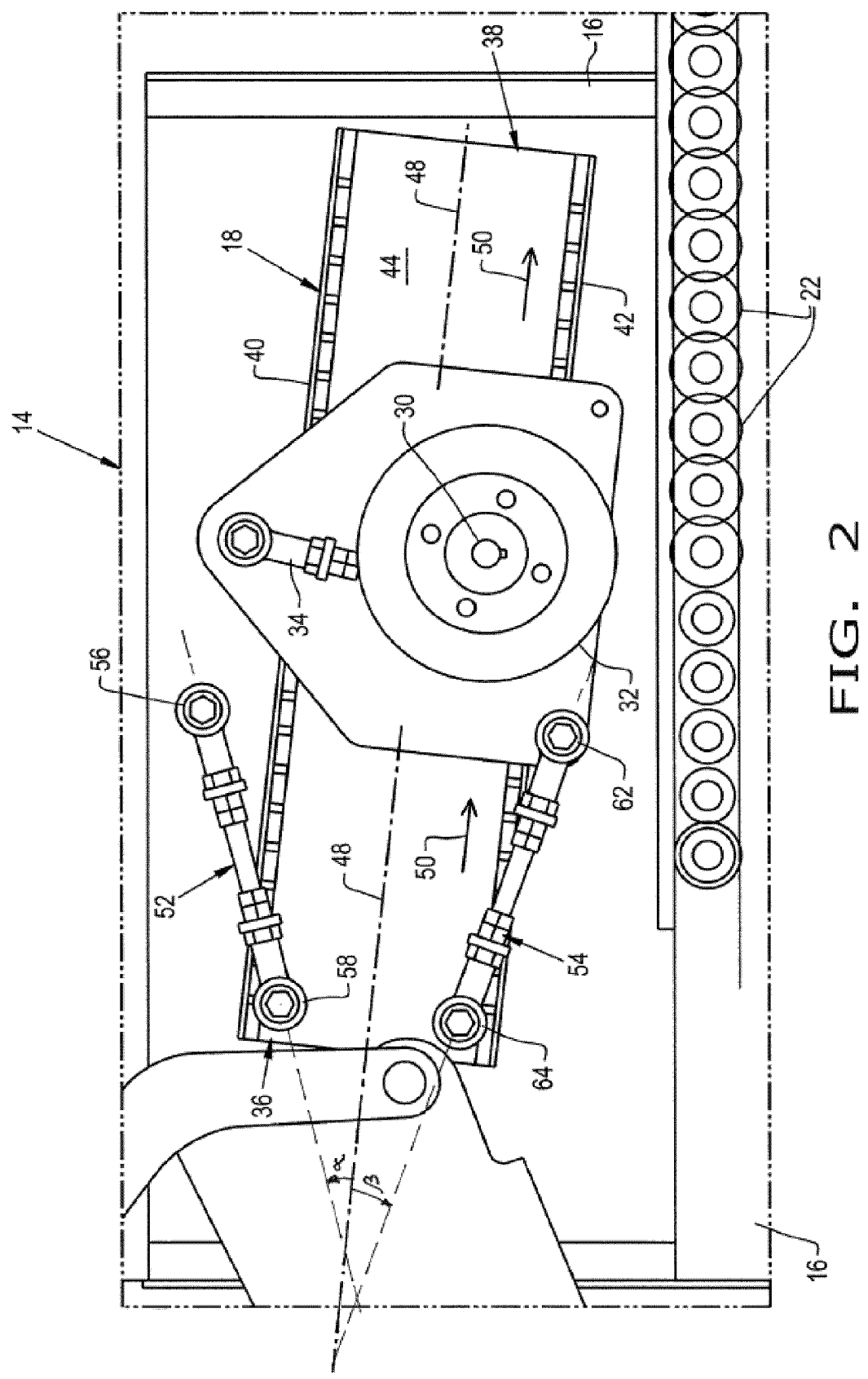
FIG. 2 is a side view of the destemmer shown in FIG. 1, taken along line section line 2-2 in FIG. 1.
Figure 3:
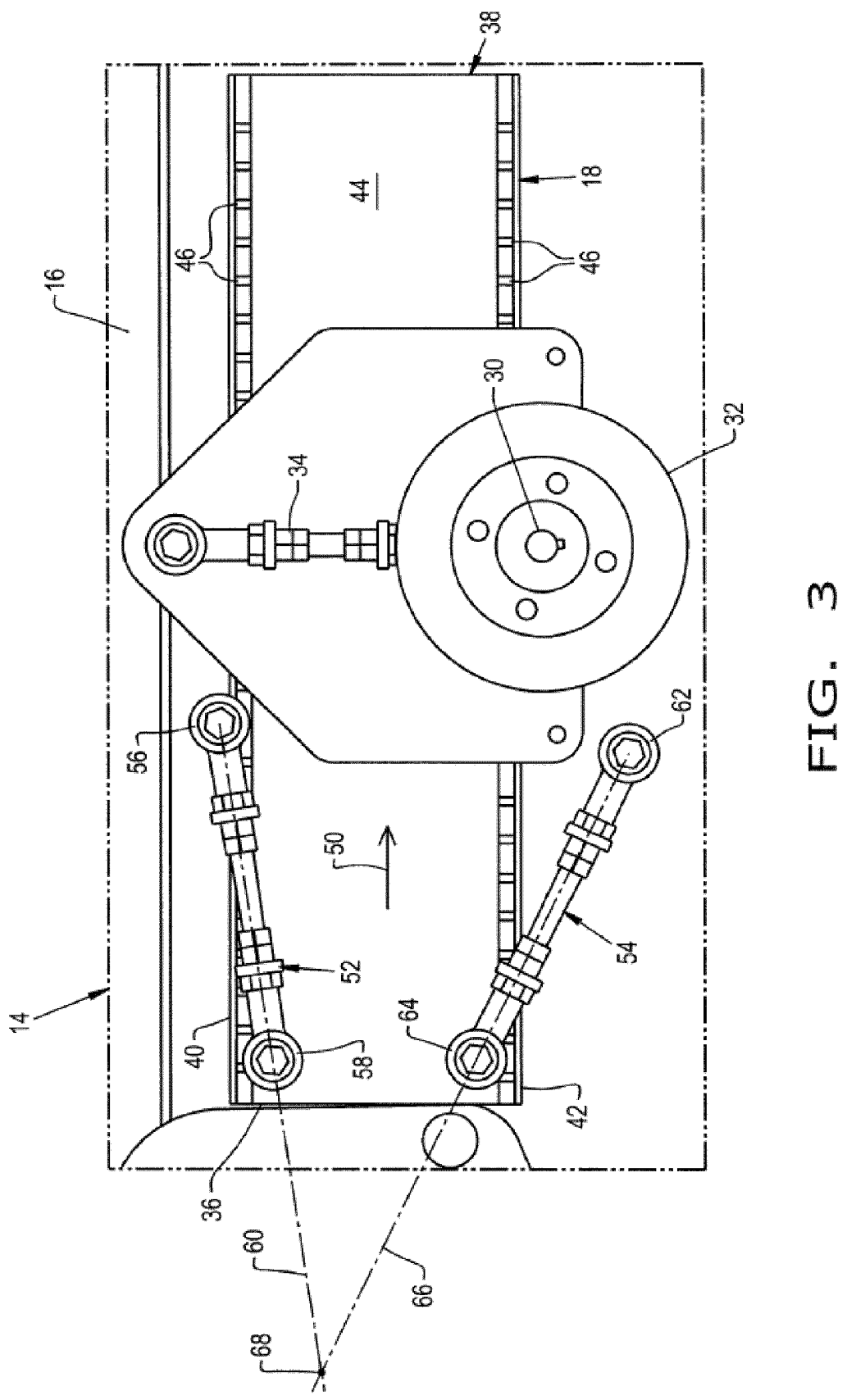
FIG. 3 is another side sectional view similar to FIG. 2, illustrating the virtual pivot axis located upstream from the inlet end of the box.

The box 18, shown more clearly in FIGS. 2 and 3, includes an inlet 36 for receiving berries and other material (MOG), an outlet 38 for discharging the berries onto the conveying rollers 22, a top wall 40, a bottom wall 42, and a pair of opposing side walls 44. The term "box", as used herein, is intended to broadly mean any box-like structure or enclosed structure having an open inlet at one end and an open outlet at an opposite end. The berries or grapes are introduced at the inlet end, the berries are shook within the box, the berries are expelled through holes in an outer wall or side of the box, and the stalks, stems, etc. are discharged from the outlet end of the box. Thus, a "box" can have many shapes and configurations to accomplish this general objective of separating the berries.

The top wall 40 and the bottom wall 42 each have a plurality of openings 46 which are sized to allow the berries to pass therethrough. The box 18 also includes a longitudinally extending central plane 48 which lies generally parallel with the bottom wall 42. The sizes of the openings 46 in the top wall 40 and the bottom wall 42 may be different to accommodate for the different behavior of the berries at each level. It is also envisageable to vary the size of the openings 46 between the front and the rear of the box 18.

According to an aspect of the present invention, the box 18 is configured such that the inlet 36 of the box 18 pivots about a virtual pivot axis which is located upstream from the inlet 36, relative to a travel direction 50 of the berries and MOG through the box 18. This allows an increased amplitude of the oscillating movement of the box 18 at the inlet 36, while still providing for even greater amplitude of the oscillating movement of the box 18 at the outlet 36.

With prior art destemmer designs, the inlet end of the box is typically directly pivotally connected to the frame. This means that the inlet end of the destemmer pivots about a given axis at the inlet end, but has little or no movement by translation at the inlet end of the box. The lack of substantial vertical movement results in absent or weak destemming action in this area. In contrast, the inlet end 36 of the box 18 of the present invention is coupled with the frame 16 in such a manner that it moves by both pivotal movement and translational movement. This provides improved separation of the berries from the stalks and stems, while at the same time minimizing the amount of space required for the oscillating box of the destemmer 14.

More particularly, at least one top link 52 and at least one bottom link 54 interconnect the box 18 and the frame 16. Each top link 52 includes a first end 56 which is pivotally connected to the frame 16, a second end 58 which is pivotally connected to the box 18, and a longitudinal axis 60. Similarly, each bottom link 54 includes a first end 62 which is pivotally connected to the frame 16, a second end 64 which is pivotally connected to the box 18, and a longitudinal axis 66. In the embodiment shown, each of the top links 52 and each of the bottom links 54 have a threaded rod and lock nut arrangement providing the top and bottom links 52 and 54 with an adjustable length. However, the top and bottom links 52 and 54 can also be configured with fixed lengths. Further, the top and bottom links 52 and 54 could also potentially be configured as gas cylinders for some applications, such as pneumatic (compressible) or hydraulic (non-compressible) cylinders.

In the illustrated embodiment, the box 18 is connected with the frame 16 using a pair of top links 52 and a pair of bottom links 54. The pair of top links 52 and the pair of bottom links 54 each have second ends 58, 64 which are pivotally connected with a respective side wall 44 at a location adjacent to the inlet 36 of the box 18.

Each of the top links 52 and each of the bottom links 54 lies at an acute angle α, β relative to the central plane 48. It will be appreciated that the angle α and β will vary as the inlet end translates up and down during operation, but it is always at an acute angle relative to the central plane 48. It will also be appreciated that the sum of angles α and β always remain acute.

Referring now to FIG. 3, it can be observed that the inlet 36 of the box 18 pivots about a virtual pivot axis 68 which is located upstream from the inlet 36, relative to the travel direction 50 of the berries and MOG through the box 18. When viewed from the side of the box 18 as shown in FIG. 3, the longitudinal axis of each top link 52 and the longitudinal axis of each bottom link 54 intersect at the virtual pivot axis 68 which is located upstream from the inlet 36 to the box 18, relative to the travel direction 50 of the berries and MOG. By selectively configuring the angle α between the top links 52 and the central plane 48, and the angle β between the bottom links 54 and the central plane 48, the distance of the virtual pivot point 68 from the inlet 36 can likewise be varied. However, in order to achieve both pivotal and translational movement of the box 18 at the inlet 36, the virtual pivot point 68 must always be located outside of the box 18 and upstream from the inlet 36. When the destemmer is in a medium state, the acute angle α between the central plane 48 and each top link 52 can be the same or different than the acute angle β between the central plane and each bottom link 54. It is observed that the virtual pivot axis 68 does not have a fixed position during operation of the destemmer, but constitutes a floating momentary pivot axis, which travels up and down along a curve upstream of and at a substantial distance from the inlet 36.

During operation of grape harvester 10, grapes bunches including stalks and stems are introduced into the inlet 36 of the box 18. The eccentric drive 20 moves the box 18 in upwards and downwards directions at a selected operating speed. The amplitude of movement of the box 18 at the inlet 36 is less than the amplitude of movement of the box at an outlet 38. The movement of the box 18 ranges between a lower position in which the central plane 48 inclines in a downward direction (see FIG. 2) toward the outlet 38 of the box 18, and an upper position in which the central plane 48 can lie generally horizontal (see FIG. 3). As the box 18 moves, the inlet 36 moves in both a pivotal and translational manner, due to the location of the virtual pivot axis 68. The downward inclination of the box 18, as well as the increased amplitude of movement as the grape bunches move from the inlet 36 toward the outlet 38, urges the grapes and MOG toward the outlet 38. The separated grapes are expelled through the openings 46 of the box 18 and fall to the conveying rollers 22 beneath the box 18. The separated stalks and stems are discharged from the outlet 38.

Figure 4:
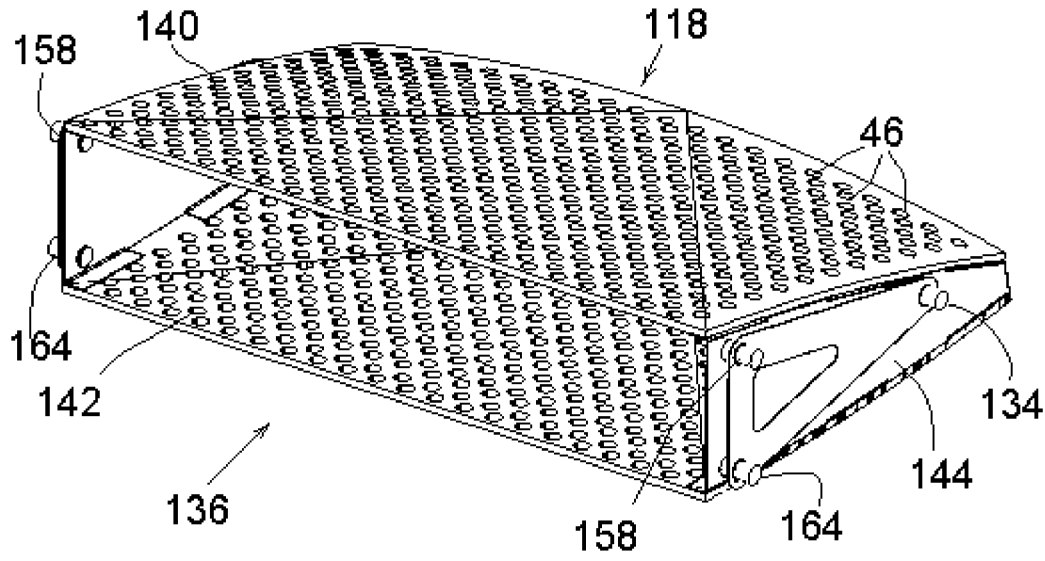
FIG. 4 is a front perspective view of a second type of box for use in the destemmer of FIG. 1.
Figure 5:
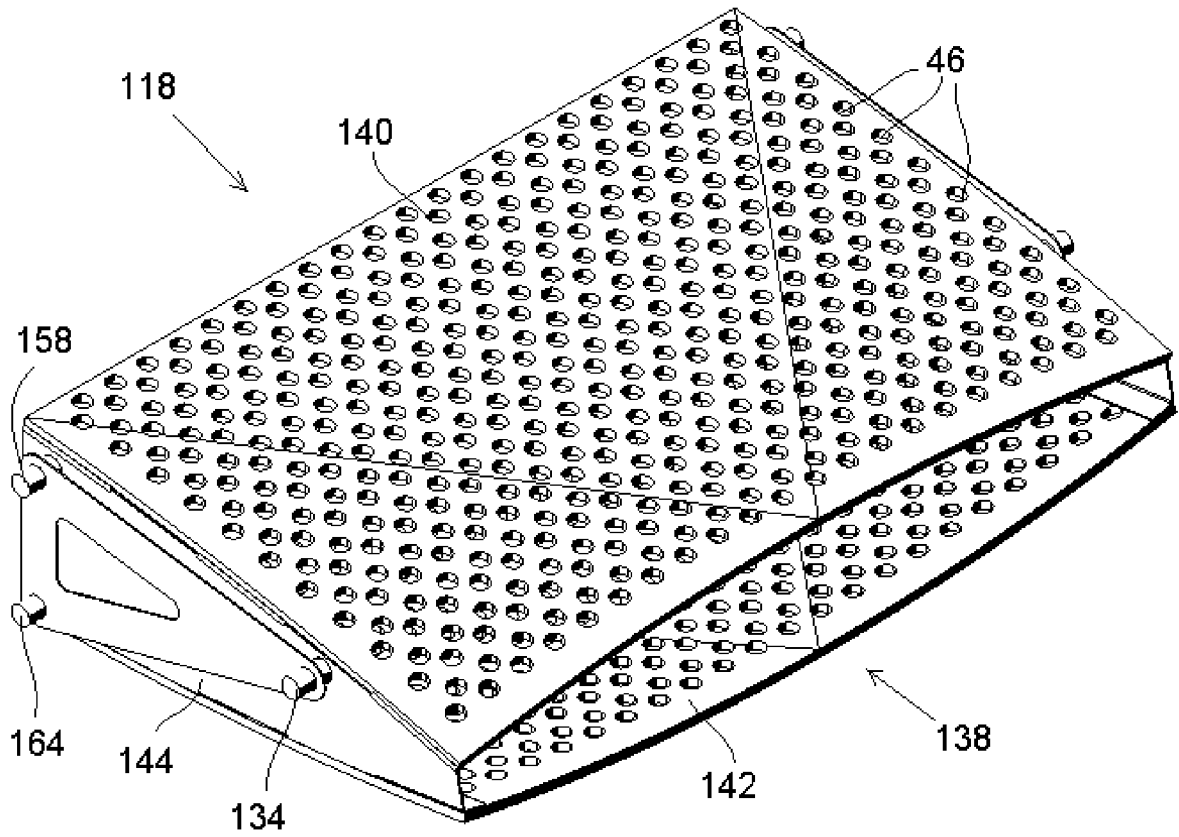
FIG. 5 is a rear perspective view of the box of FIG. 4.

The box 18 illustrated in FIGS. 1-3 has an overall rectangular cuboid shape. FIGS. 4 and 5 illustrate another possible box shape, which may advantageously installed in the destemmer 14. The box 118 has a rectangular inlet 136, which may have the same size as inlet 36 of the first box 18. The box 118 has a top wall 140 and a bottom wall 142, which converge to the rear of the box 118, such that the outlet 138 has a surface area that is smaller than the area of the inlet 136. The size and shape of the inlet 136 are optimized for receiving the grapes, bunches and MOG. The diminishing area of the cross section towards the rear accommodates the diminishing volume of the harvested material travelling to the outlet 138.

The side walls 144 of the box 118 have a substantially trapezoidal shape. Near the inlet 136, the side walls 144 are provided each with an upper and a lower connection point, e.g., an upper stub 158 and a lower stub 164, for mounting the front end of the box to the second end 58 of top link 52 and the second end 64 of the bottom link 54, respectively. A third connection point, e.g., a stub 134, is provided closer to the outlet 138 for mounting the link 34 of the eccentric drive 20.

The outlet 138 does not need to have a rectangular shape. Its height may be higher at the center than adjacent the side walls 144. As illustrated in FIGS. 4 and 5, the rear edges of the top wall 140 and the bottom wall 142 may be curved outwardly at the middle of the outlet 138. Alternatively, the edges make take a chevron shape, with the tips directed outwardly. Where a curved outlet 138 is provided, the top wall 140 and the bottom wall 142 may comprise a straight triangular section in the middle, with a base at the inlet 136 and curved triangular sections at the sides of the middle triangular section, the curved sections coming together at the outlet 138. The curved walls 140, 142 concentrate the remaining crop material towards the center of the box 118 when it travels from the inlet 136 to the outlet 138. Such effect is advantageous when the harvester is working on slopes as it counteracts the tendency of the crop material to concentrate at the lower side of the cuboid box 18.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A destemmer for use in a fruit harvester, comprising:
   a frame configured for mounting to a fruit harvester;
   a box carried by the frame, the box including an inlet for receiving berries and other material (MOG);
   an eccentric drive connected with the box for moving the box in an oscillating manner within the frame;
   at least one top link interconnecting the box and the frame, the at least one top link including a first end pivotally connected to the frame, a second end pivotally connected to the box, and a longitudinal axis; and
   at least one bottom link interconnecting the box and the frame, the at least one bottom link including a first end pivotally connected to the frame, a second end pivotally connected to the box, and a longitudinal axis,
   wherein, when viewed from a side, the longitudinal axis of the at least one top link and the longitudinal axis of the at least one bottom link intersect at a virtual pivot axis which is located upstream from the inlet to the box, relative to a travel direction of the berries and MOG through the box.

2. The destemmer of claim 1, wherein, during operation, the inlet of the box moves in an oscillating manner by both pivotal movement and translational movement.

3. The destemmer of claim 1, wherein the at least one top link and the at least one bottom link are pivotally connected to the box at a location adjacent to the inlet of the box.

4. The destemmer of claim 1, wherein:
   the box further includes a pair of opposing side walls;

the at least one top link comprises a pair of top links, each being pivotally connected with a respective one of the pair of opposing side walls; and the at least one bottom link comprises a pair of bottom links, each being pivotally connected with a respective one of the pair of opposing side walls.

5. The destemmer of claim 1, wherein the box further includes a top wall, a bottom wall, and a pair of opposed side walls, the top wall or the bottom wall having a plurality of openings which are sized to allow the berries to pass therethrough, and wherein each of the at least one top link and the at least one bottom link has an end which is pivotally connected with a respective one of the pair of opposed side walls.

6. The destemmer of claim 1, wherein the box further includes a bottom wall and a longitudinally extending central plane which lies generally parallel with the bottom wall, and wherein the at least one top link lies at an acute angle (a) relative to the central plane, and the at least one bottom link lies at an acute angle (B) relative to the central plane.

7. The destemmer of claim 6, wherein, during operation, movement of the box ranges between a lower position in which the central plane inclines in a downward direction toward an outlet of the box, and an upper position in which the central plane lies generally horizontally.

8. The destemmer of claim 6, wherein the destemmer has a state; in which the acute angle ($\alpha$) is the same as the acute angle ($\beta$).

9. The destemmer of claim 6, wherein a sum of the acute angle ($\alpha$) and the acute angle ($\beta$) is less than 90°.

10. The destemmer of claim 1, wherein each of the at least one top link and the at least one bottom link has a fixed length.

11. The destemmer of claim 1, wherein during operation, an amplitude of movement of the box at the inlet is less than an amplitude of movement of the box at an outlet.

12. The destemmer of claim 1, wherein the box further includes an outlet having an area smaller than an area of the inlet.

13. The destemmer of claim 12, wherein the outlet of the box has a height that is greater at a center of the outlet than adjacent side walls of the box.

14. The destemmer of claim 1, wherein upper and lower edges of the outlet of the box are curved.

15. A fruit harvester, comprising a destemmer according to claim 1.

* * * * *